United States Patent
Ohsawa et al.

(10) Patent No.: US 6,509,900 B1
(45) Date of Patent: Jan. 21, 2003

(54) IMAGE MANAGEMENT APPARATUS AND METHOD, IMAGE MANAGEMENT SYSTEM, AND STORAGE MEDIUM

(75) Inventors: Hidefumi Ohsawa, Urawa (JP); Yasuhiko Yasuda, Musashino (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/258,206

(22) Filed: Feb. 26, 1999

(30) Foreign Application Priority Data

Mar. 9, 1998 (JP) .......................................... 10-056621

(51) Int. Cl.$^7$ ................................................ G06F 12/02

(52) U.S. Cl. ........................ 345/543; 345/557; 711/171; 711/160

(58) Field of Search ................................. 345/543, 530, 345/536, 557; 711/159, 160, 170–173, 118, 119, 122, 133, 136

(56) References Cited

U.S. PATENT DOCUMENTS

| | | | | |
|---|---|---|---|---|
| 5,392,396 A | * | 2/1995 | MacInnis | 395/509 |
| 5,559,952 A | * | 9/1996 | Fujimoto | 395/551 |
| 5,822,759 A | * | 10/1998 | Treynor | 711/134 |
| 5,905,853 A | * | 5/1999 | Murakami | 395/115 |
| 5,929,869 A | * | 7/1999 | Wilde | 345/508 |
| 5,956,744 A | * | 9/1999 | Robertson et al. | 711/122 |

* cited by examiner

Primary Examiner—Kee M. Tung
(74) Attorney, Agent, or Firm—Fitzpatrick, Cella, Harper & Scinto

(57) ABSTRACT

To increase the cache hit ratio of a requested image and shorten the user's average waiting time, images of a CD-ROM changer are cached in an intermediate HDD having a high retrieval speed, and provided to the user. When a requested image is not cached in the intermediate HDD, the free volume of the intermediate HDD is checked. If the intermediate HDD is judged not to have a free volume, images of hierarchies having large volumes are erased from ones stored the intermediate HDD in the order from lower popuralities or older access dates.

23 Claims, 6 Drawing Sheets

IMAGE MANAGEMENT APPARATUS AND METHOD, IMAGE MANAGEMENT SYSTEM, AND STORAGE MEDIUM

BACKGROUND OF THE INVENTION

1. Field of the Invention

The present invention relates to an image management apparatus and method, image management system, and storage medium for accumulating image data having a hierarchical structure.

2. Related Background Art

Most of conventional image services of this type provide search images (index images) as service images.

Recent photo-CDs use an image format having a multi-level hierarchical structure in which the image length and width are set to ½, ¼, ⅛, . . . and the area is set to ¼, ¹⁄₁₆, ¹⁄₆₄, . . . .

An example of image database design devices having this hierarchy image format is one having a low-speed large-capacity external storage device (CD-ROM changer or the like) and a high-speed small-capacity external storage means (cache hard disk and the like).

Algorithms for the cache of the high-speed small-capacity external storage means are (1) a method of storing only reduced images in the high-speed small-capacity external storage device, (2) a method of storing all images requested once for retrieval in the high-speed small-capacity external storage device, and (3) a method of erasing and replacing images in the order from older access dates.

As for the server configuration method, a "forgetful image database" is proposed.

For example, "Image Database System With Graceful Oblivision Mechanism and Three-Dimensional Browser", Journal of the Institute of Image Electronics Engineers of Japan, Vol. 25, No. 4, pp. 339–350, 1996 reports that the coefficient of popularity is defined, and hierarchy images are erased and replaced in the order from smaller coefficients, thereby increasing the cache hit ratio.

In such systems, if requested images are not stored in the high-speed small-capacity external storage means (cache hard disk or the like), the user's waiting time becomes long, and no good services can be provided.

For this reason, images left in the high-speed small-capacity memory means determine the effectiveness of the system.

That is, the cache hit ratio on a hierarchy corresponding to an image requested by the user must be increased to shorten the user's average waiting time.

SUMMARY OF THE INVENTION

According to an aspect of the present invention, there is provided an image management apparatus which retrieves image data having a hierarchical structure from low-speed large-capacity storage means to high-speed small-capacity storage means to provide desired image data, comprising first judgment means for judging a free volume of the small-capacity storage means, and control means for, when the first judgment means judges that the small-capacity storage means does not have a free volume, erasing image data of a hierarchy having a large volume from the image data stored in the small-capacity storage means.

DETAILED DESCRIPTION OF THE PREFERRED EMBODIMENTS (First Embodiment)

Figure 1:
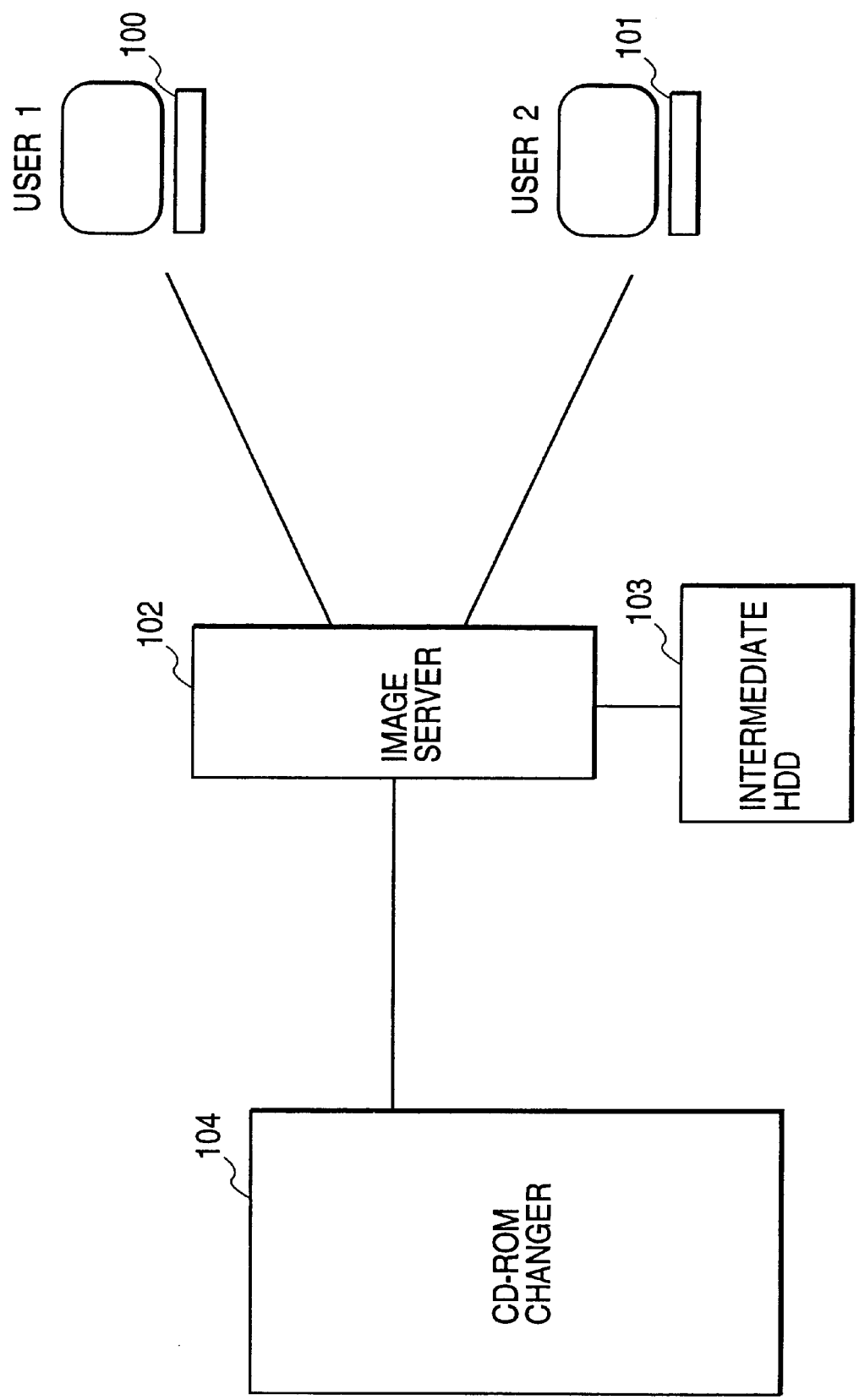
FIG. 1 is a view showing the arrangement of a system according to the present invention.

FIG. 1 is a view showing the arrangement of a system according to the present invention.

User 1 100 and user 2 101 designate the names and hierarchy numbers of images requested to an image server 102 via a network.

The image server 102 having received the request from the user checks whether the requested hierarchy image is stored in a high-speed small-capacity external storage device (intermediate HDD 103), and if the image is stored, quickly transmits the image data to the user.

If the requested hierarchy image is not stored in the intermediate HDD 103, the image server 102 must retrieve the image data from a low-speed large-capacity external storage device (CD-ROM changer 104). First, the image server 102 checks the volume of the intermediate HDD 103.

If the intermediate HDD 103 has a sufficient volume, the image server 102 operates the CD-ROM changer 104 to set a CD-ROM in which the requested image is stored in the CD-ROM drive, retrieves the image to the intermediate HDD 103, and transmits the image data stored in the intermediate HDD 103 to the user.

If the intermediate HDD 103 does not have a sufficient volume, image data which is judged to be erasable by various judgment methods (to be described later) is erased from the intermediate HDD 103 to increase the free space, and the image data is retrieved from the CD-ROM.

When the requested image data is stored in the intermediate HDD 103, the user's waiting time is short; when the requested image data is not stored, the user's waiting time becomes long owing to the operation time of the CD-ROM changer 104 and the retrieval time from the CD-ROM.

To shorten the waiting time, images which are frequently requested must be stored in the intermediate HDD 103 (the user's hit ratio must be increased).

The arrangement of the image server 102 will be briefly described with reference to FIG. 6 before an explanation of hierarchy image service processing in the image server 102 as one feature of the first embodiment.

Figure 6:
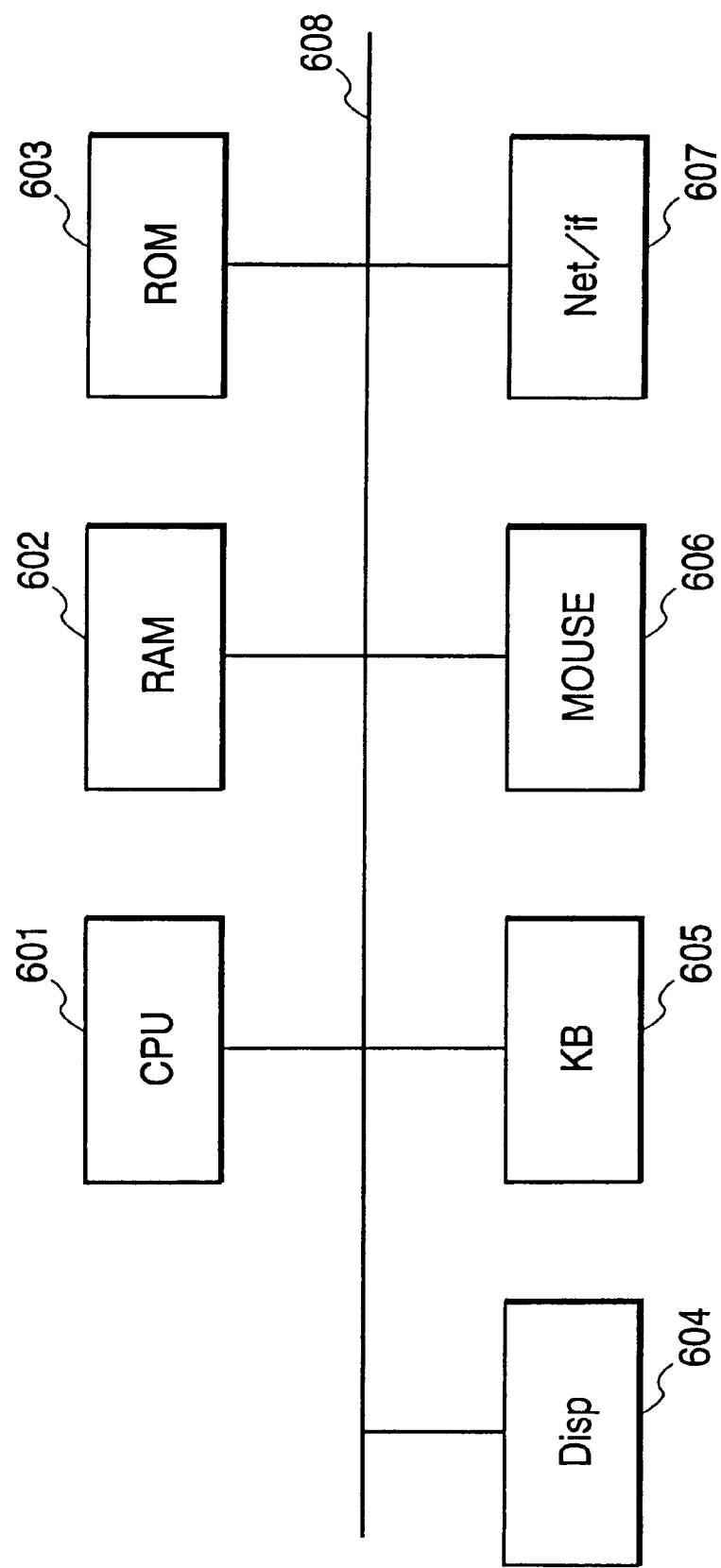
FIG. 6 is a view showing the arrangement of an image server.

Referring to FIG. 6, the image server 102 comprises a CPU 601 which operates in accordance with programs (FIGS. 2, 3, and 4) that realize procedures (to be described later), a RAM 602 which provides a storage area necessary for operation of these programs, a ROM 603 which holds the programs that realize the procedures, a display 604, a keyboard (KB) 605, an input device 606 such as a mouse, a network interface 607 which realizes communication with another device, and a bus 608.

The hierarchy image service processing in the image server 102 of the first embodiment will be described with reference to FIG. 2.

If the image server 102 receives a user's access in step S200, the image server 102 judges a requested image N and hierarchy K in step S201.

In step S202, the image server 102 judges whether the hierarchy image judged in step S201 is stored in the intermediate HDD 103 (cache).

If YES in step S202, the image server 102 retrieves the image data from the intermediate HDD 103 (cache) in step S203, and increases the popurality of the hierarchy K of this image N in step S205.

The image server 102 transmits the image data to the user in step S211 to complete the service.

In this case, the user can quickly receive the service.

If NO in step S202, the image server 102 checks the access frequency counter value in step S206. If the average access value per unit time is lower than the predetermined level, the image server 102 checks the disk volume of the intermediate HDD 103 in step S207, and retrieves in step S208 the image data into the intermediate HDD 103 using an algorithm of retrieving only a requested hierarchy from the CD-ROM changer 104.

If the average access value per unit time is equal to or higher than the predetermined level, the image server 102 checks the disk volume of the intermediate HDD 103 in step S209, and retrieves in step S210 the image data into the intermediate HDD 103 using an algorithm of retrieving all hierarchies of the requested image from the CD-ROM changer 104.

In this way, the retrieval hierarchy is changed in accordance with the access frequency. When the average access frequency is low, only a requested hierarchy is retrieved; when this frequency is high, all hierarchies are retrieved.

This is because the probability of request for high-resolution images of the same image is high during the operation time of the CD-ROM changer 104, and all hierarchies are effectively retrieved by one operation.

To the contrary, when the average access frequency is low, only a requested hierarchy is effectively retrieved to effectively use the disk of the intermediate HDD 103.

Figure 3:
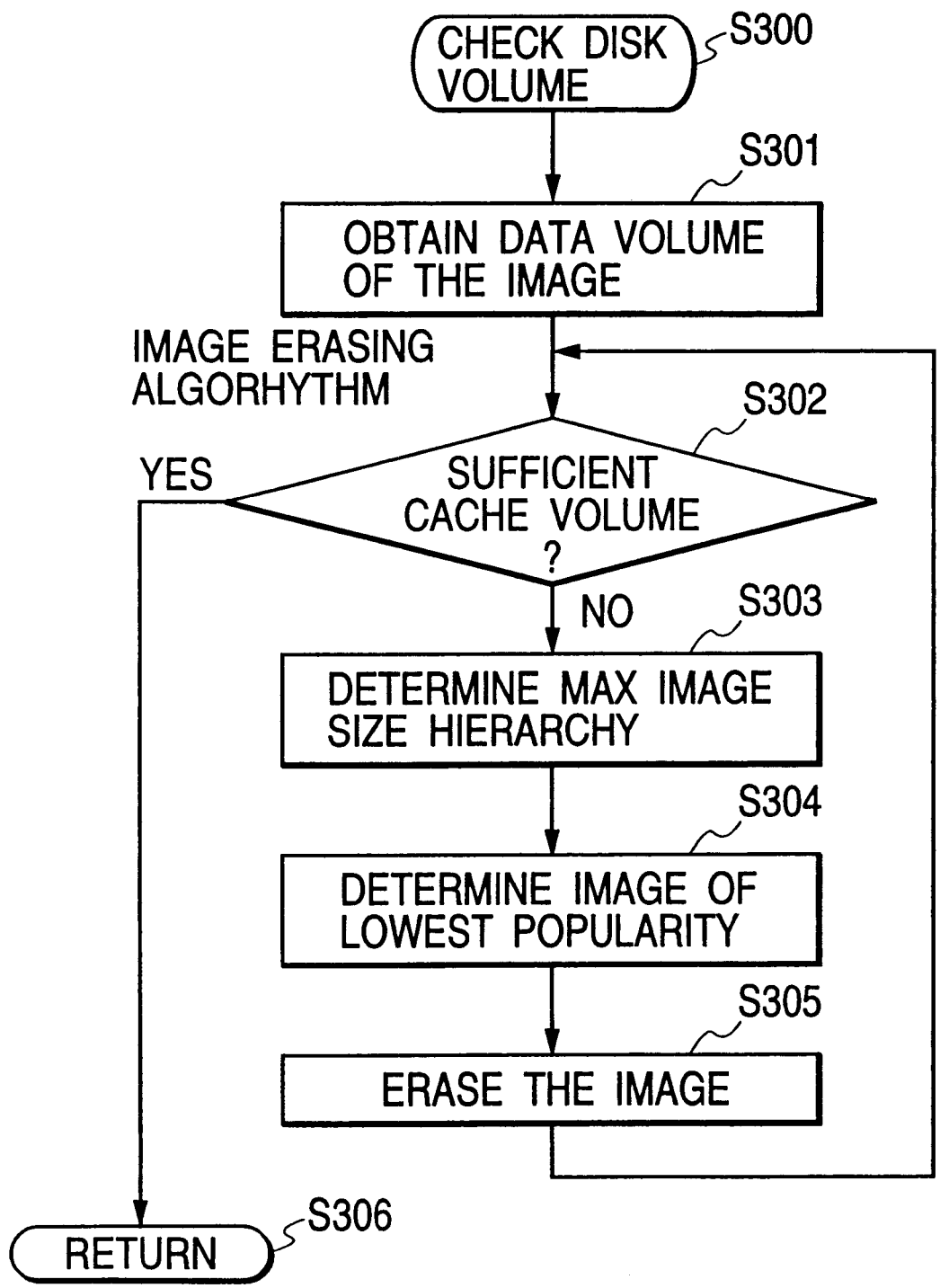
FIG. 3 is a flow chart for clearing an intermediate HDD (cache)

FIG. 3 is a flow chart for clearing the intermediate HDD 103 (cache).

Figure 2:
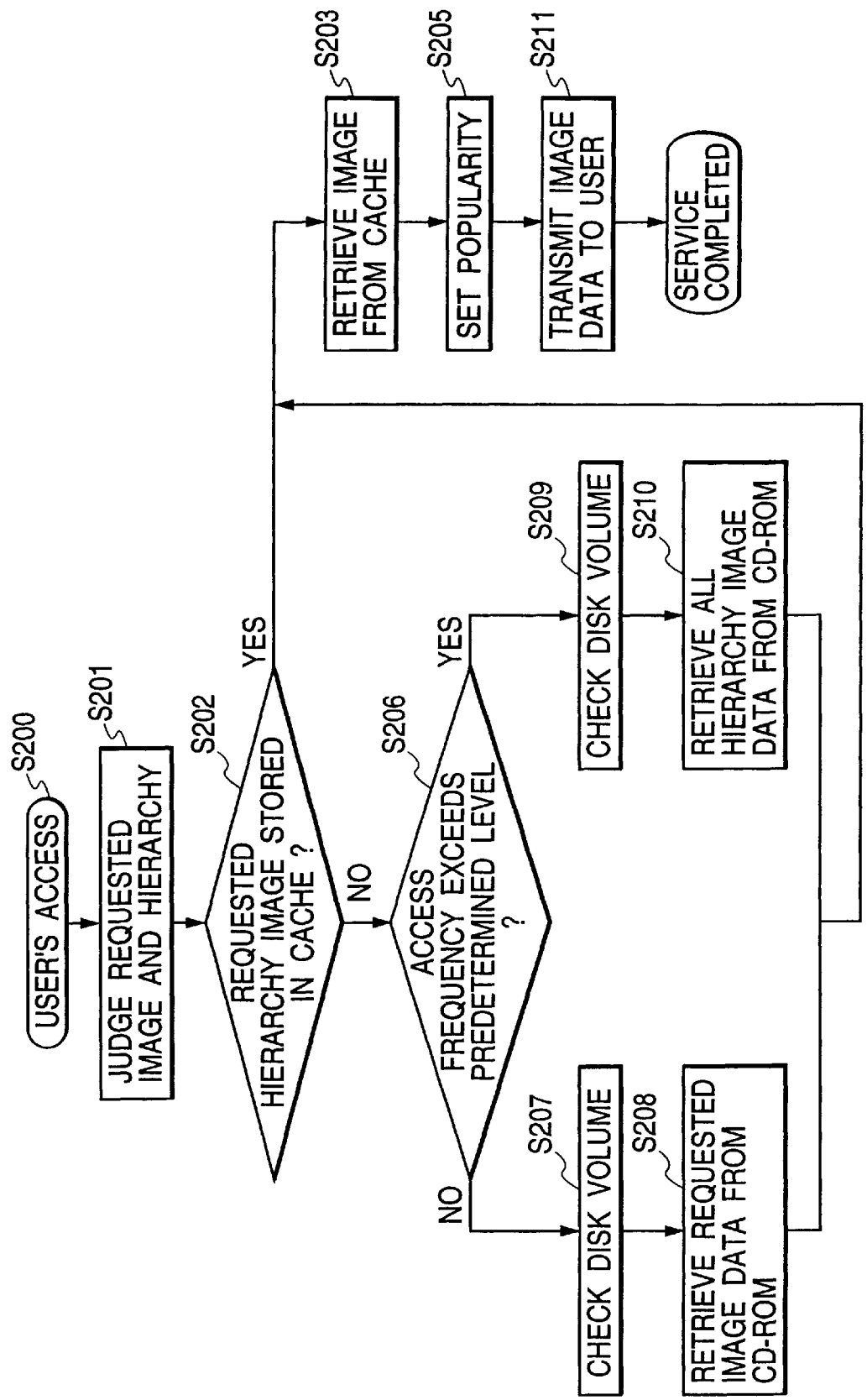
FIG. 2 is a flow chart of a hierarchy image service in the image server.

That is, the flow chart in FIG. 3 corresponds to the processes in steps S207 and S209 in FIG. 2.

The image server 102 checks in step S301 the data volume of an image which must be retrieved from the CD-ROM, and judges in step S302 whether the intermediate HDD 103 (cache) has a sufficient volume.

If YES in step S302, the flow returns in step S306 to the processing in FIG. 2.

If NO in step S302, the image server 102 determines in step S303 a max image size hierarchy stored in the intermediate HDD 103, determines the popuralities of all images of this hierarchy in step S304, and erases images in the order from lower popuralities in step S305.

This processing is performed until the intermediate HDD 103 (cache) is judged every erase to attain a sufficient volume. If the intermediate HDD 103 (cache) attains a sufficient volume, the flow returns in step S306 to the processing in FIG. 2.

The popurality is imparted to a combination of the image and hierarchy, but the present invention is not limited to this.

Figure 5:
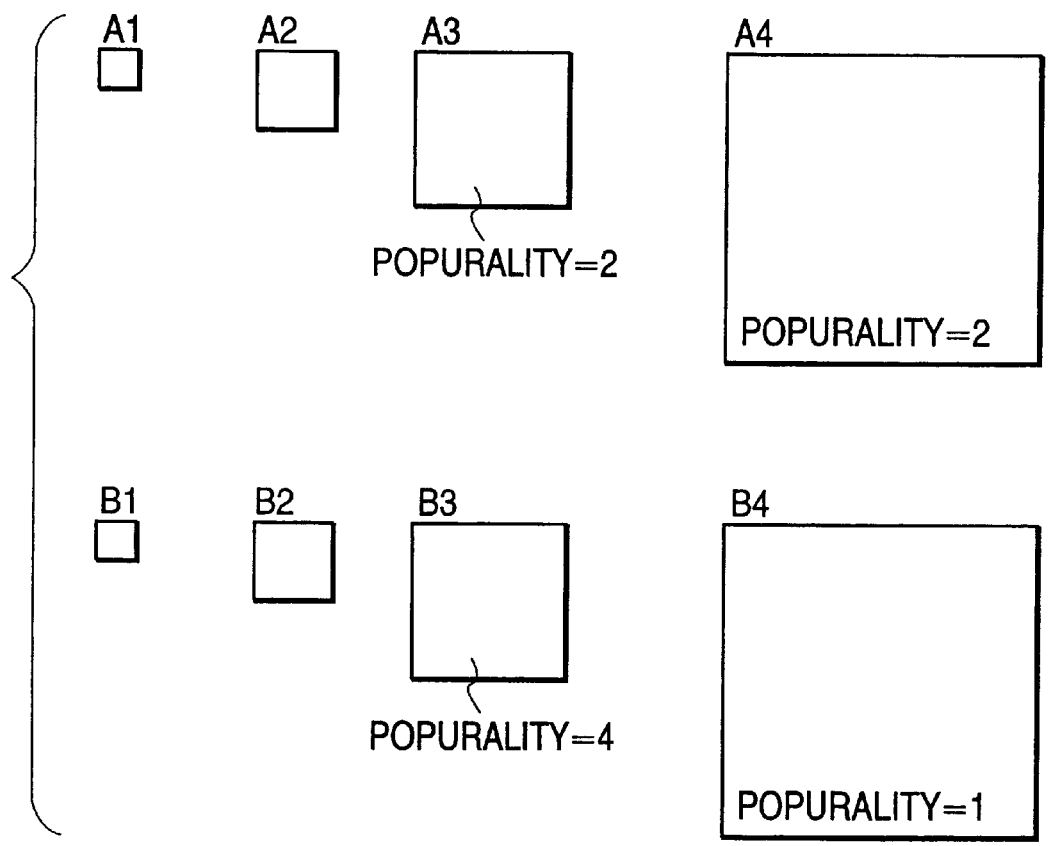
FIG. 5 is an explanatory view of the erasing method of hierarchy images stored in the intermediate HDD (cache)

FIG. 5 is an explanatory view of the erasing method of hierarchy images stored in the intermediate HDD 103 (cache).

Assume that four hierarchies (A1, A2, A3, A4) or (B1, B2, B3, B4) of each of two images A and B are stored in the intermediate HDD 103 (cache). The images A1 to A4 are the same image with different resolutions.

Upon reception of a request of clearing the intermediate HDD 103 (cache), the hierarchies A4 and B4 having the maximum resolution are subjected to erase. The popuralities of A4 and B4 are checked to find 2 for A4 and 1 for B4. Thus, B4 is erased first, and then A4 is erased. In the first embodiment, a larger numerical value means higher popurality.

If the intermediate HDD 103 (cache) cannot have a sufficient volume yet, since no image having the maximum resolution exists, the images A3 and B3 having the second maximum resolution are subjected to erase. The popuralities of A3 and B3 are checked to find 2 for A3 and 4 for B3. Therefore, A3 is erased first, and then B3 is erased.

The popurality is indicated by a numerical value which is incremented by 1 every access to each hierarchy, but the present invention is limited to this.

As described above, since the erasing order is determined by the popurality imparted to each hierarchy of each image, an image and hierarchy having a high access frequency can be left to increase the cache hit ratio.

(Second Embodiment)

Figure 4:
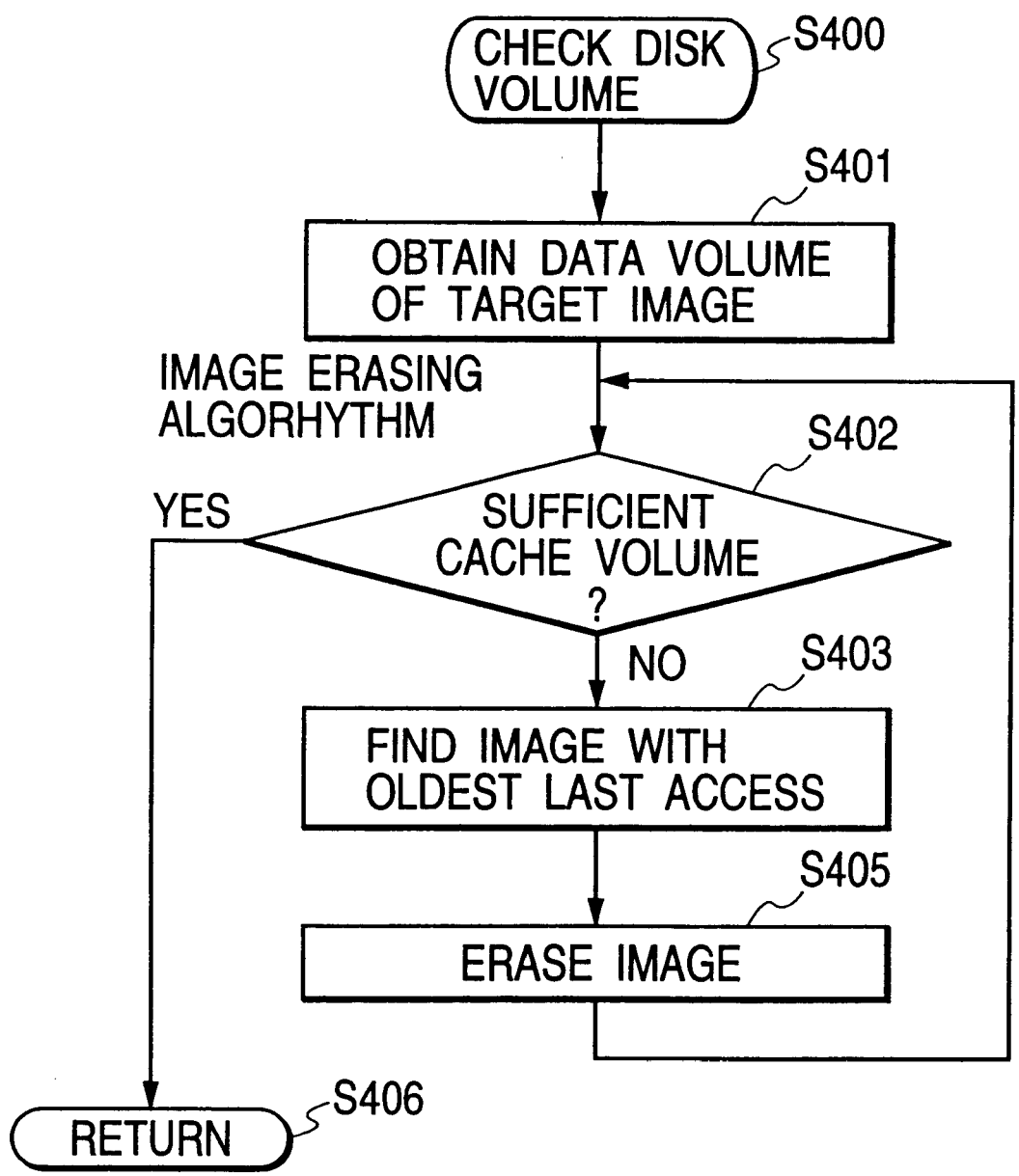
FIG. 4 is another flow chart for clearing the intermediate HDD (cache)

FIG. 4 is another flow chart for clearing an intermediate HDD 103 (cache).

That is, the flow chart in FIG. 4 corresponds to the processes in steps S207 and S209 in FIG. 2.

An image server 102 checks in step S401 the data volume of an image which must be retrieved from the CD-ROM, and judges in step S402 whether the intermediate HDD 103 (cache) has a sufficient volume.

If YES in step S402, the flow returns in step S406 to the processing in FIG. 2.

If NO in step S402, the image server 102 finds in step S403 the access history of images stored in the intermediate HDD 103, and erases images in the order from older access dates in step S405.

This processing is performed until the intermediate HDD 103 (cache) is judged every erase to attain a sufficient volume. If the intermediate HDD 103 (cache) attains a sufficient volume, the flow returns to the processing in FIG. 2.

The erasing order and popurality are imparted to a combination of the image and hierarchy, but the present invention is not limited to this.

The image format of image data having a plurality of hierarchies in these embodiments can also be applied to photo-CD and FlashPix.

Although the program is held in the ROM in the above embodiments, the present invention is not limited to this and may be realized by an arbitrary storage medium or circuit which performs the same operation.

Note that the present invention may be applied to a system constituted by a plurality of devices or an apparatus constituted by one device. The present invention is also achieved when a recording medium in which program codes of software for realizing the functions of the aforementioned embodiments are recorded is supplied to a system or apparatus, and the computer (CPU or MPU) in the system or apparatus reads and executes the program codes stored in the recording medium. In this case, the program codes read from the recording medium realize the functions of the above-described embodiments by themselves, and the recording medium on which the program codes are recorded constitutes the present invention.

As a recording medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above embodiments are realized not only when the read program codes are executed by the computer but also when the OS running on the computer performs part or all of actual processing on the basis of the instructions of the program codes.

The functions of the above embodiments are also realized when the program codes read from the recording medium are written in the memory of a function expansion board in the computer or a function expansion unit connected to the computer, and the CPU of the function expansion board or function expansion unit performs part or all of actual processing on the basis of the instructions of the program codes.

As has been described above, according to the present invention, since the access frequency per unit time is checked to determine whether to retrieve all hierarchies of a hierarchy image or only a requested hierarchy image, the cache hit ratio can increase to shorten the user's waiting time for services.

When cached hierarchy images are to be erased, they are erased in the order from larger sizes, and thus the cache can be effectively used.

When cached hierarchy images are to be erased, data are erased in the order from lower popularities, and thus the cache hit ratio can increase to shorten the user's waiting time for services.

When cached hierarchy images are to be erased, they are erased in the order from older access dates, and thus the cache hit ratio can increase to shorten the user's waiting time for services.

What is claimed is:

1. An image management apparatus, which retrieves and transfers image data with a hierarchical structure from low-speed large-capacity storage means to high-speed small-capacity storage means to provide desired image data, said apparatus comprising:

first judgment means for judging if the small-capacity storage means has a sufficiently free volume of storage space;

checking means for checking an average access frequency per unit time of image data requested by a user; and control means for, when said first judgment means judges that the small-capacity storage means does not have a sufficiently free volume of storage space, increasing the free volume of storage space by determining a maximum image size hierarchy and erasing image data with a large volume in the maximum image size hierarchy in the small-capacity storage means, wherein, when the average access frequency, checked by said checking means, in the requested hierarchy is lower than a predetermined value, said control means retrieves image data of the requested hierarchy from the large-capacity storage means and transfers the image data to said free volume of storage space in the small-capacity storage means, or when the average access frequency, checked by said checking means, in the requested hierarchy is higher than the predetermined value, said control means retrieves image data of all hierarchies from the large-capacity storage means and transfers the image data to said free volume of storage space in the small-capacity storage means.

2. An apparatus according to claim 1, wherein said first judgment means judges whether the small-capacity storage means has a free volume sufficient to store image data requested by a user.

3. An apparatus according to claim 1, wherein, when more than one image data of a same hierarchy are to be erased, said control means erases image data in order from a lower priority to a higher priority.

4. An apparatus according to claim 1, wherein, when more than one image data of a same hierarchy are to be erased, said control means erases image data in order from an older access date to a more recent access date.

5. An apparatus according to claim 1, wherein said apparatus further comprises second judgment means for judging whether the image data requested by the user is stored in the small-capacity storage means, and, when said second judgment means judges that the requested image data is not stored in the small-capacity storage means, the requested image data is retrieved from the large-capacity storage means and stored in the small-capacity memory means.

6. An apparatus according to claim 1, further comprising third judgment means for judging a hierarchy of image data requested by a user.

7. An image management system for managing image data with a hierarchical structure, said system comprising:

low-speed large-capacity storage means;

high-speed small-capacity storage means;

means for retrieving and transferring image data with the hierarchical structure from said low-speed large-capacity storage means to said high-speed small-capacity storage means to provide desired image data;

first judgment means for judging if the small-capacity storage means has a sufficiently free volume of storage space;

checking means for checking an average access frequency per unit time of image data requested by a user; and control means for, when said first judgment means judges that said small-capacity storage means does not have a sufficiently free volume of storage space, increasing the free volume of storage space by determining a maximum image size hierarchy and erasing image data with a large volume in the maximum image size hierarchy in said small-capacity storage means, wherein, when the average access frequency, checked by said checking means, in the requested hierarchy is lower than a predetermined value, said control means retrieves image data of the requested hierarchy from the large-capacity storage means and transfers the image data to said free volume of storage space in the small-capacity storage means, or when the average access frequency, checked by said checking means, in the requested hierarchy is higher than the predetermined value, said control means retrieves image data of all hierarchies from the large-capacity storage means and transfers the image data to said free volume of storage space in the small-capacity storage means.

8. A system according to claim 7, wherein said first judgment means judges whether said small-capacity storage means has a free volume sufficient to store image data requested by a user.

9. A system according to claim 7, wherein, when more than one image data of a same hierarchy are to be erased, said control means erases image data in order from a lower priority to a higher priority.

10. A system according to claim 7, wherein, when more than one image data of a same hierarchy are to be erased, said control means erases image data in order from an older access date to a more recent access date.

11. A system according to claim 7, wherein said system further comprises second judgment means for judging whether image data requested by a user is stored in said small-capacity storage means, and, when said second judgment means judges that the requested image data is not stored in said small-capacity storage means, the requested image data is retrieved from said large-capacity storage means and stored in said small-capacity memory means.

12. A system according to claim 7, further comprising third judgment means for judging a hierarchy of image data requested by a user.

13. An image management method of an image management apparatus, which retrieves and transfers image data with a hierarchical structure from low-speed large-capacity storage means to high-speed small-capacity storage means to provide desired image data, said method comprising:

a first judgment step of judging if the small-capacity storage means has a sufficiently free volume of storage space;

an access check step of checking an average access frequency per unit time of image data requested by a user; and a control step of, when the small-capacity storage means is judged in said first judgment step not to have a sufficiently free volume of storage space, increasing the free volume of storage space by determining a maximum image size hierarchy and erasing image data with a large volume in the maximum image size hierarchy in the small-capacity storage means, wherein, when the average access frequency, checked in said access check step, in the requested hierarchy is lower than a predetermined value, said control step retrieves image data of the requested hierarchy from the large-capacity storage means and transfers the image data to said free volume of storage space in the small-capacity storage means, or when the average access frequency, checked in said access check step, in the requested hierarchy is higher than the predetermined value, said control means retrieves image data of all hierarchies from the large-capacity storage means and transfers the image data to said free volume of storage space in the small-capacity storage means.

14. A method according to claim 13, wherein said judgment step comprises judging whether the small-capacity storage means has a free volume sufficient to store image data requested by a user.

15. A method according to claim 13, wherein said control step comprises erasing image data in order from a lower priority to a higher priority when more than one image data of a same hierarchy are to be erased.

16. A method according to claim 13, wherein said control step comprises erasing image data in order from an older access date to a more recent access date when more than one image data of a same hierarchy are to be erased.

17. A method according to claim 13, wherein said method further comprises a second judgment step of judging whether image data requested by a user is stored in the small-capacity storage means, and, when the requested image data is judged in said second judgment step not to be stored in the small-capacity storage means, the requested image data is retrieved from the large-capacity storage means and stored in the small-capacity memory means.

18. A method according to claim 13, further comprising a third judgment step of judging a hierarchy of image data requested by a user.

19. A storage medium storing a program for implementing an image management method of an image management apparatus, which retrieves and transfers image data with a hierarchical structure from low-speed large-capacity storage means to high-speed small-capacity storage means to provide desired image data, the program comprising:

program code of a first judgment step of judging if the small-capacity storage means has a sufficiently free volume of storage space;

program code of an access check step of checking an average access frequency per unit time of image data requested by a user; and program code of a control step of, when the small-capacity storage means is judged in the first judgment step not to have a sufficiently free volume of storage space, increasing the free volume of storage space by determining a maximum image size hierarchy and erasing image data with a large volume in the maximum image size hierarchy in the small-capacity storage means, wherein, when the average access frequency, checked in said access check step, in the requested hierarchy is lower than a predetermined value, the control step retrieves image data of the requested hierarchy from the large-capacity storage means and transfers the image data to said free volume of storage space in the small-capacity storage means, or when the average access frequency, checked in said access check step, in the requested hierarchy is higher then the predetermined value, said control means retrieves image data of said all hierarchies from the large-capacity storage means and transfers the image data to said free volume of storage space in the small-capacity storage means.

20. An image management apparatus which retrieves and transfers image data with a hierarchical structure from low-speed large-capacity storage means to high-speed small-capacity storage means to provide desired image data, comprising:

checking means for checking an average access frequency per unit time of image data in a requested hierarchy requested by a user; and control means for, when the average access frequency, checked by said checking means, in the requested hierarchy is lower than a predetermined value, retrieving image data of the requested hierarchy from the large-capacity storage means and transferring the image data to the small-capacity storage means, or when the average access frequency, checked by said checking means, in the requested hierarchy is higher than the predetermined value, retrieving image date of all hierarchies from the large-capacity storage means and transferring the image data to the small-capacity storage means.

21. An image management system for managing image data with a hierarchical structure, said system comprising:

low-speed large-capacity storage means;

high-speed small-capacity storage means;

checking means for checking an average access frequency per unit time of image data in a requested hierarchy; and control means for, when the average access frequency, checked by said checking means, in the requested hierarchy is lower than a predetermined value, retrieving image data of the requested hierarchy from the large-capacity storage means and transferring the image data to the small-capacity storage means, or when the average access frequency, checked by said checking means, in the requested hierarchy is higher than the predetermined value, retrieving image date of all hierarchies from the large-capacity storage means and transferring the image data to the small-capacity storage means.

22. An image management method of an image managing apparatus which retrieves image data having a hierarchical structure from low-speed large-capacity storage means to high-speed small-capacity storage means to desired image data, comprising:

a checking step of checking an average access frequency per unit time of image data in a requested hierarchy requested by a user; and a control step of, when the average access frequency, checked in said checking step, in the requested hierarchy is lower than a predetermined value, controlling retrieval of image data of the requested hierarchy from the large-capacity storage means and transfer of the image data to the small-capacity storage means, or when the average access frequency, checked in said checking step, in the requested hierarchy is higher than the predetermined value, retrieval of image date of all hierarchies from the large-capacity storage means and transfer of the image data to the small-capacity storage means.

23. A storage medium for storing control program codes of an image management apparatus which retrieves image data having a hierarchical structure from low-speed large-capacity storage means to high-speed small-capacity storage means to desired image data, comprising:

a program code of a checking step of checking an average access frequency per unit time of image data in a requested hierarchy requested by a user; and a program code of a control step of, when the average access frequency, checked in said checking step, in the requested hierarchy is lower than a predetermined value, controlling retrieval of image data of the requested hierarchy from the large-capacity storage means and transfer of the image data to the small-capacity storage means, or when the average access frequency, checked in said checking step, in the requested hierarchy is higher than the predetermined value, retrieving image date of all hierarchies from the large-capacity storage means and transfer of the image data to the small-capacity storage means.

* * * * *

UNITED STATES PATENT AND TRADEMARK OFFICE
CERTIFICATE OF CORRECTION

PATENT NO. : 6,509,900 B1
DATED : January 21, 2003
INVENTOR(S) : Hidefumi Ohsawa and Yasuhiko Yasuda It is certified that error appears in the above-identified patent and that said Letters Patent is hereby corrected as shown below:

<u>Title page,</u>
Item [*] Notice, please delete present text and insert: -- [*] Notice: This patent issued on a continued prosecution application filed under 37 CFR 1.53(d), and is subject to the twenty year patent term provisions of 35 U.S.C. 154(a)(2). --.

Item [57] ABSTRACT,
Line 10, "popuralities" should read -- popularities --.

<u>Drawings,</u>
Sheet 3, Fig. 3, "ALGORHYTHM" should read -- ALGORITHM --.
Sheet 4, Fig. 4, "ALGORHYTHM" should read -- ALGORITHM --.
Sheet 5, Fig. 5, "POPURALITY" (all occurrences) should read -- POPULARITY --.

<u>Column 3,</u>
Lines 6 and 57, "popurality" should read -- popularity --.
Lines 49 and 51, "popuralities" should read -- popularities --.

<u>Column 4,</u>
Lines 1 and 9, "popuralities" should read -- popularities --.
Line 5, "rality" should read -- larity --.
Lines 12, 16 and 39, "popurality" should read -- popularity --.
Line 14, "is limited" should read -- is not limited --.

<u>Column 5,</u>
Line 20, "popuralities" should read -- popularities --.

<u>Column 6,</u>
Line 11, "memory" should read -- storage --.

UNITED STATES PATENT AND TRADEMARK OFFICE
CERTIFICATE OF CORRECTION

PATENT NO.   : 6,509,900 B1
DATED        : January 21, 2003
INVENTOR(S)  : Hidefumi Ohsawa and Yasuhiko Yasuda It is certified that error appears in the above-identified patent and that said Letters Patent is hereby corrected as shown below:

<u>Column 8,</u>
Line 23, then" should read -- than --.
Line 24, "said" (second occurrence) should be deleted.
Line 44, "date" should read -- data --.

<u>Column 9,</u>
Line 4, "to" should read -- to provide --.
Line 17, "date" should read -- data --.

<u>Column 10,</u>
Line 3, "to" should read -- to provide --.
Line 17, "date" should read -- data --.

Signed and Sealed this

Ninth Day of September, 2003

JAMES E. ROGAN
*Director of the United States Patent and Trademark Office*